Nov. 1, 1938.  W. H. FRANK ET AL  2,134,755
ELECTRICAL DISTRIBUTION SYSTEM

Original Filed Oct. 21, 1935

INVENTORS
William H. Frank
BY Lyman C. Fisher
Daniel G. Allen. ATTORNEY.

Patented Nov. 1, 1938

2,134,755

UNITED STATES PATENT OFFICE 2,134,755

ELECTRICAL DISTRIBUTION SYSTEM

William H. Frank and Lyman C. Fisher, Detroit, Mich.

Original application October 21, 1935, Serial No. 45,924. Divided and this application April 17, 1936, Serial No. 74,910

1 Claim. (Cl. 105—155)

This application relates to electrical distribution systems and more particularly relates to details of load supports provided in connection with a slotted tubular duct of the character disclosed herein and in application Serial No. 45,924, filed October 21, 1935 of which the instant application is a division.

In an electrical distribution system of the type under consideration there is provided a fixedly supported, elongated, slotted tubular duct in which ride collectors having contacts engaging bus bars within the duct; these contacts are electrically connected to the load through suitable conductors.

In many instances it is desirable to have the load supported from the duct, as well as electrically supplied by the bus bars of the duct, and this application relates to details of load supports.

Figure 1:
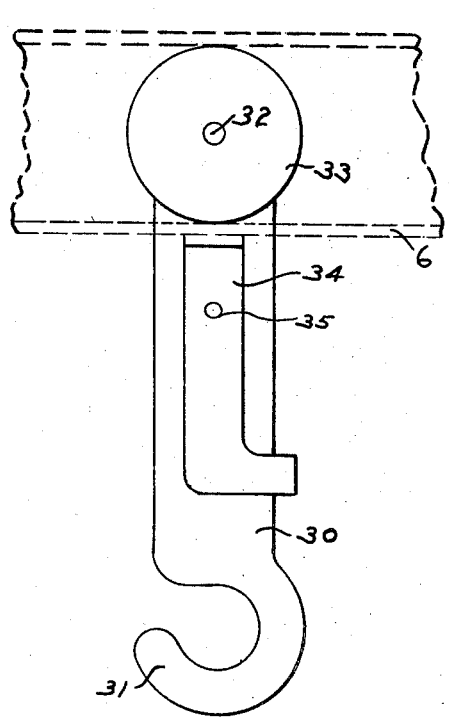

For an understanding of the load support constituting the disclosure of this application, reference should be had to the drawing presented in connection with this specification. In the drawing, Figs. 1 and 2 are side and end views of a support in the form of a trolley provided with a tool hanger hook and a trolley clamp.

The duct

Figure 2:
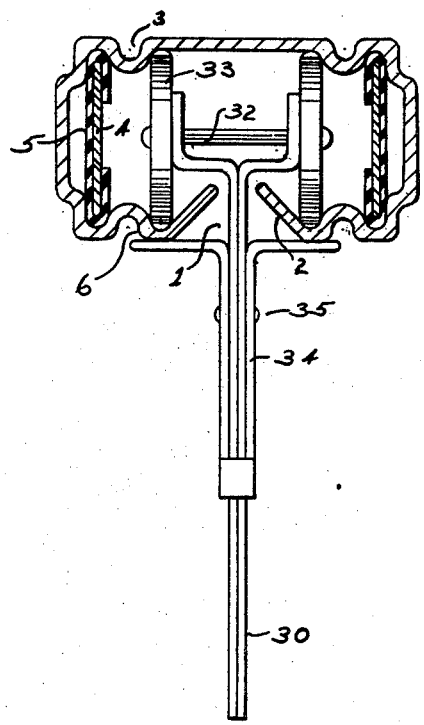

The duct with which the load support here shown is to be utilized is shown in Fig. 2 and comprises an elongated tube of rectangular cross section in whose bottom wall is an elongated slot 1 bounded by edge flanges 2. On the top and bottom walls of the duct, and between each edge flange and the adjacent side wall of the duct are inwardly projecting ribs 3. Between such pair of ribs 3 and the side wall of the duct is a bus bar 4 enshrouded in insulation 5 and between each pair of ribs 3 and the edge flanges 2 are tracks 6, the bottom pair of which are in the nature of U-shaped grooves and the upper pair of which are in the nature of dihedral angles between the top wall of the duct and the ribs 3.

It is understood that the duct and its slot, ribs, grooves, tracks, bus bars, insulation, etc., are continuous and it is also understood that at desired spaced points there are provided intermediate entrances formed to permit the slot to be widened sufficiently to permit a trolley or load support to be inserted into the duct and removed therefrom through the thus widened slot.

For use with the duct above described, a load support has been provided and it will now be described.

In Figs. 1 and 2 there is shown a load support in the form of a plate 30 equipped at its lower end with a hook 31 and at its upper end with an axle 32 journalling rollers 33 formed to ride in the tracks of the duct. A clamp 34 is pivoted at 35 on the plate 30, whereby the support as a whole may be clamped in a desired place in the duct.

We claim:

In combination, a slotted tube trolley duct having a slotted wall and a wall opposite thereto, a load support comprising two adjacent plates, each having its upper portion bent away from the other plate and flanged upwardly, an axle passing through holes in the flanges, wheels on the ends of the axle riding on the interior surfaces of the aforementioned walls of the duct, the plates riding in the slot and depending from the axle, and a clamp pivoted on the depending parts of the plates and manipulable to engage the outside surface of the slotted wall and with the cooperation of the wheels engaging the inside surface of the slotted wall to clamp the load support in fixed position on the duct.

WILLIAM H. FRANK.
LYMAN C. FISHER.